Joseph Wm. McClughan
Frederick Pruter, Jr.
INVENTORS

BY Murray Robinson
ATTORNEY

United States Patent Office 3,539,914
Patented Nov. 10, 1970

---

3,539,914
SIGNALLING MAGNETIC FLAW DETECTOR
Joseph Wm. McClughan and Frederick Pruter, Jr., Houston, Tex., assignors, by direct and mesne assignments, to Smith International, Inc., Midland, Tex., a corporation of California
Filed Oct. 11, 1967, Ser. No. 674,472
Int. Cl. G01r 33/12
U.S. Cl. 324—37       3 Claims

---

ABSTRACT OF THE DISCLOSURE

Apparatus for inspection of material to detect flaws therein includes a direct current coil for magnetizing the pipe being inspected, and pick up coils annularly disposed around the inside of a member through which the pipe extends, the pipe and buggy being relatively axially movable. The outputs of the amplifiers from the coils also feed peak detector circuits each adapted to conduct current whenever the applied voltage exceeds a predetermined value. Whenever a peak detector passes current it illuminates an incandescent lamp in series therewith and in addition such current may, through a galvanometer, drive an event marking pen.

---

BACKGROUND OF THE INVENTION

Field of the invention

The invention relates to inspection of material for anomolies and more particularly to magnetic inspection of magnetizable steel oil well drill pipe for detection of cracks and pits by the flux leakage method.

Description of prior art

A known apparatus for inspecting drill pipe includes means for magnetizing the pipe, usually axially, e.g. an electric solenoid, usually carrying direct current, placed, usually coaxially, on the pipe, and means to scan the magnetized pipe with a plurality of search coils disposed, usually annularly, around the pipe, and means to generate signals in the search coils whenever in the presence of flux leakage from the pipe. Usually the scanning means effects relative axial motion of the pipe and search coils, and usually the same relative axial motion is relied upon to generate the signals in the search coils although other separate or different means may be used for that purpose. The search coils, individually or in groups, are connected to one or more amplifiers which feed into one or more galvanometers each driving a recording pen. Excursions of the trace marked by a pen on the record paper are diagnostic of the pipe condition, the greater the amplitude the greater the anomoly.

Difficulty is experienced with the above described known pipe inspection apparatus in four respects: monitoring, calibration, consistency, and range.

(i) Monitoring.—One operator cannot simultaneously visually monitor eight pen traces from eight search coils. Therefore he must shut down the pipe inspection equipment while he inspects the record or else the outputs of the search coils must be grouped to reduce the number of pen traces to be monitored, with resulting loss of centainty as to location of anomolies and with increased possibility of faulty operation going unnoticed.

(ii) Calibration.—It is difficult to calibrate the apparatus so that passage of an anomoly of a given size and shape will produce a desired amplitude of pen excursion and each pen will have the same amplitude of excursions for the same anomoly. This is due in large measure to the rather crude construction of ink recording pens, the friction between pen and paper depending on the pen pressure which must be manually adjusted, usually by bending a low yield spring.

(iii) Consistency.—Assuming an initially correct calibration of the pipe inspection apparatus, the calibration is likely to become incorrect after a short period of time. Much of the loss of calibration results from variations in the factors affecting the friction between pen and paper, such as humidity, temperature, paper composition and ink composition, and paper speed, the latter affecting the drag on the pen.

(iv) Range.—The range of rate of change of flux density through which the search coil can act and produce a proportional amplitude of pen excursion is limited in large part by the galvanometer driving the pen. Every galvanometer has a natural frequency of oscillation as determined by the spring constant of the restoring spring and the moment of inertia of the rotor. The voltage generated by a search coil is usually of an alternating nature and if the frequency of the coil voltage is the same as the natural frequency of the galvanometer, pen excursions of abnormally large amplitude result. The power supply for the direct current magnetizing coil is usually derived by rectifying the power from a 60 c.p.s. alternating current source, with the result that there is always a small percentage 60 c.p.s. AC component in the leakage flux scanned by the search coils. Although this can be filtered out electrically to some extent, there is nevertheless an extraneous 60 c.p.s. signal fed to each galvanometer of which account must be taken mechanically. If mechanical damping is used, the response will be sluggish, so that the amplitude of high frequency response over a wide range will be less than the response to an equal voltage signal of low frequency. If a galvanometer is selected having a high natural frequency, e.g. 90 c.p.s., the construction will necessarily be light and fragile and the rotor coil will overheat from the continual small currents due to unimportant anomolies in the pipe. It is usual therefore to use a galvanometer having a natural frequency of 30 to 45 c.p.s. and a moderate amount of mechanical damping together with a low pass filter in the electric circuit. The resultant apparatus is relatively unresponsive above 45 c.p.s.

SUMMARY OF THE INVENTION

According to the present invention primary reliance for detection of anomolies creating large magnitude voltages in the search coils is placed on electronic peak voltage detector means. According to the preferred embodiment, the output of each search coil, after amplification is fed to a plurality of peak detector circuits, each responsive to a different peak voltage, as well as being fed to a power amplifier feeding a pen galvanometer. Each voltage peak detector may include a four element transistor such as an SCR or an equivalent electronic switch. If the search coil produces sufficient voltage to close the switch, current flow through the switch causes an incandescent lamp in series with the switch to be lighted. Other indicator means such as a bell or a mechanical register may be connected in series with the switch or be controlled thereby. An electronic switch type peak detector can be calibrated more easily than the pen recorder. Once calibrated it will remain calibrated for a longer period of time than a pen recorder. The electronic switch type peak detector has no natural frequency response for which compensation must be made. The peak detector output, being of a simple on or off nature, can be readily monitored by the operator. If the peak detector indicates the presence of a large anomoly, the operator can then study the pen record to diagnose its nature. An event marker pen connected to the peak detector, helps the operator to locate the pertinent part of the record to be examined.

It is to be noted, with reference to the monitoring problem, that the light or other signal produced by the peak detector when sufficient voltage is received continues until it is turned off by a reset circuit. This is quite different from the momentary excursion of a marking pen. Furthermore, the signal light is stationary, not moving like the pen record. Finally, only pertinent signals are produced by the peak detector circuit, whereas the pen recorder makes an excusion for every anomoly regardless of its size, and the pertinent large amplitude excusions must be singled out from amongst a large number of meaningless trivia.

The improved monitoring, together with the other advantages of the inertialess, electronic peak detector type anomoly indication means of the present invention, namely, easier and longer lasting calibration plus frequency independent response, result in a tremendous gain in the usefulness of pipe inspection service. The better results at lower cost make the service economically more attractive to a larger segment of drill pipe users who might otherwise chance failure of the drill pipe in the well with the resultant loss of time and money due to expensive fishing jobs.

DESCRIPTION OF PREFERRED EMBODIMENT

Figure 1:
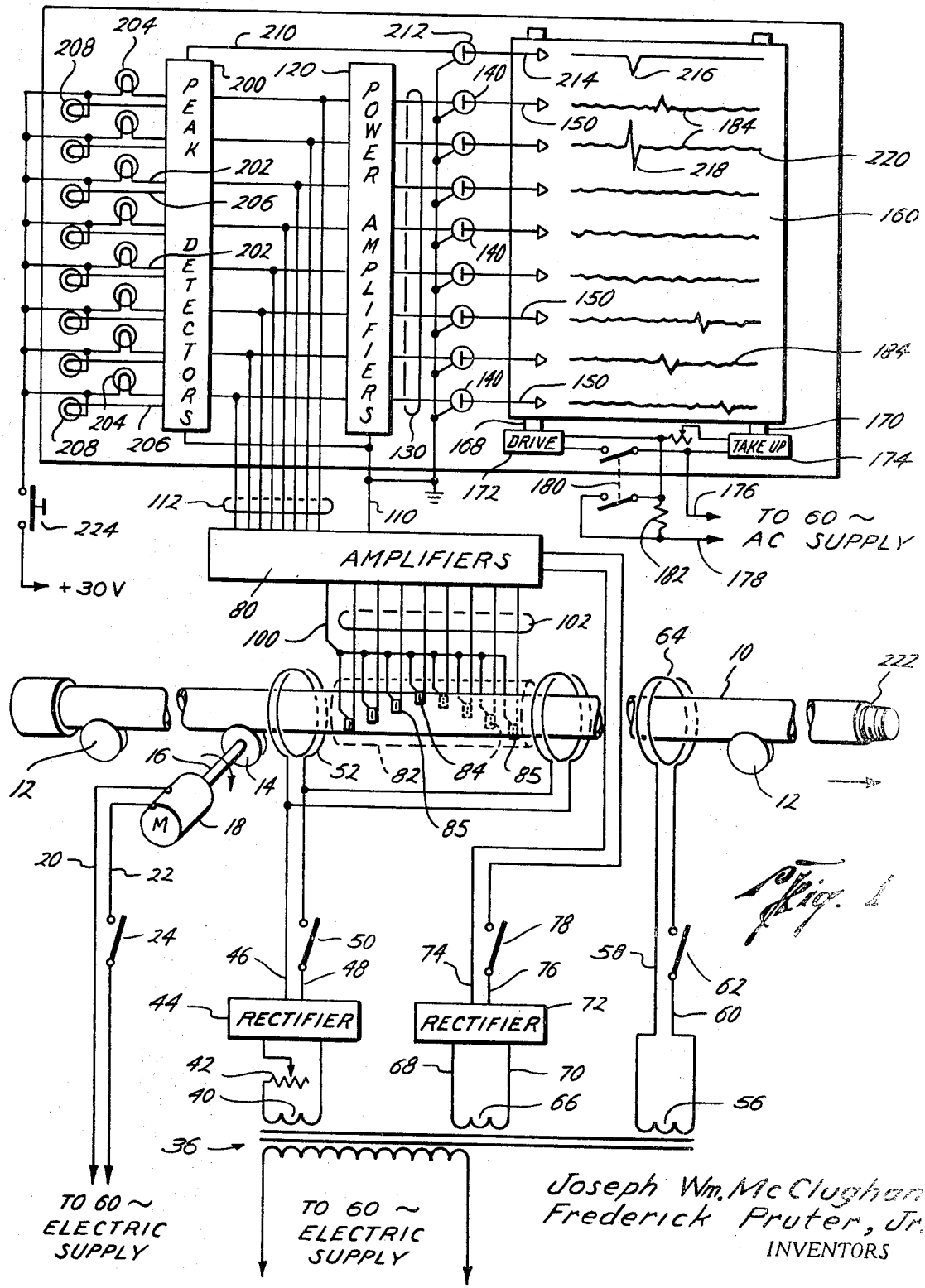
FIG. 1 is a schematic view of an apparatus incorporating the invention.

Referring now to FIG. 1 there is shown a length of pipe 10 in position to be inspected by an apparatus embodying the invention.

The pipe inspection apparatus includes means to support the pipe for axial motion including one or more pairs of idler rollers 12 and means to move the pipe axially including drive roller 14 connected by shaft 16 to constant speed alternating current drive motor 18. The motor 18 is connected through conductors 20, 22 and switch 24 to a suitable source of sixty cycle per second alternating current electric power (not shown).

A transformer 36 has a primary winding connected to a source of 60 cycle per second alternating current electric power (not shown). A secondary winding 40 of transformer 36 is connected through potentiometer 42 to the input of rectifier 44. The output of rectifier 44 is connected through conductors 46, 48, and switch 50 to two direct current solenoids such as 52 disposed coaxially around pipe 10. The solenoids 52 provide means to magnetize the pipe axially.

Another secondary winding 56 on transformer 36 is connected through conductors 58, 60, and switch 62 to alternating current solenoid 64 disposed coaxially around pipe 10. Solenoid 64 provides means to demagnetize the pipe following inspection, thereby to avoid adherence of steel particles, especially on the threaded ends of the pipe.

Another secondary 66 on transformer 36 is connected through conductors 68, 70 to the input of rectifier 72. The output of the rectifier is connected through conductors 74, 76, and switch 78 to a bank of amplifiers 80 to supply power thereto.

Between magnetizing and demagnetizing solenoids 52 and 64 is disposed search coil means comprising a carriage 82. A plurality, e.g. eight, search coils 84 are mounted on carriage 82, being disposed annularly about the pipe. The search coils may each be individually housed in a non-magnetic shoe 85 disposed to slide upon and bear resiliently against the outer surface of the pipe in known manner. One end of each search coil is connected to common conductor 100 going to the input of amplifier bank 80, a further component of the search coil means. The other ends of the search coils are individually connected to amplifier bank 80 through conductors 102.

The previously mentioned means to support the pipe for axial motion and to move the pipe axially provides means to scan the pipe with the search coil means. If desired, the pipe can be held stationary and the scanning accomplished by moving the search coil carriage axially along the pipe. In such case the solenoids are preferably mounted to move along with the carriage.

The means to magnetize the pipe together with the means for causing axial motion of the pipe provide means to generate signals in the search coil means in response to the presence of anomolies in the pipe being scanned as a function of a magnitude of the anomolies, e.g. the larger or deeper a pit, the greater the signal.

The output of amplifier bank 80 is connected through a common conductor 110 and individual conductors 112 to a bank of power amplifiers 120. The output of power amplifier bank 120 is connected through individual conductors 130 to the eight galvanometers 140. The galvanometers drive pens 150 to record on paper 160 the signals generated by the eight search coils 84. The paper is unrolled from drum 168 onto roll 170 by drive motor 172 and take up motor 174. The motors 172 and 174 are connected through conductors 176, 178 to a source of 60 c.p.s. alternating current (not shown). There is a two pole switch 180 in the circuit connecting the motors to the power supply. When switch 180 is open the drive motor 172 is disconnected and resistor 182 is thrown into series with take up motor 174 which is normally left connected to keep tension on the paper. As the paper unrolls from drum 168 onto drum 170, the pens 150 trace eight records 184 of the signals received from search coils 84. The power amplifier banks, galvanometers, pens, paper, paper rolls, and roll drive motors provide electromechanical means to record separately a magnitude of the signals received from each search coil means as a function of the position of the search coil means relative to the material being scanned thereby, both the paper and the pipe being driven at constant speed.

The output of amplifier bank 80 through conductors 110 and 112 is also connected to electronic switch means comprising bank of peak detectors 200. The output of peak detector bank 200 is connected through eight conductors 202 to indicator means comprising eight colored indicator lamps 204, which may for example be colored orange. The bank of peak detectors 200 is also connected through eight conductors 206 to eight colored indicator lamps 208, which are preferably of a different color such as red.

Whenever a signal from a search coil exceeds a predetermined value, the corresponding orange lamp will come one. If an even larger signal exceeding a larger predetermined value is received, both the orange and red lamps corresponding to that search coil will light up. The peak detectors may, for example, be set so that a red light indicates a flaw of such magnitude that the pipe probably must be discarded, whereas an orange light indicates a defect of such magnitude as probably to require downgrading of the pipe.

Whenever a lamp 208 is lit up, the bank of peak detectors 200 also sends a pulse through conductor 210 to galvanometer 212 which drives pen 214. Pen 214 records a pipe 216 whenever it receives a pulse and may be called an event marker since it marks the event each time a lamp 208 is lit. With the aid of pips 216 the operator may quickly identify the corresponding portion, e.g. 218 of the record trace of the pen corresponding to the same search coil as the indicator lamp 208 which was lit. The operator, by examination of excursion 218 of the record can determine whether the anomoly in the pipe that caused the signal sent by the search coil is of a deleterious nature. If examination of the excursion 218 leaves the operator in doubt, he can locate the corresponding part of the pipe by noting the distance of excursion 218 from the starting point 220 of the record trace and measuring off a proportional distance from the end 222 of the pipe. He can then make a further inspection of the anomolous portion of the pipe. The azimuthal position of the anomaly around the circumference of the pipe will be known by noting which one of the eight red lamps are lighted, since each red lamp corresponds to a particular one of the eight search coils whose azimuthal position is known. Before resuming pipe inspection the operator will open normally closed switch 224 to turn off all the orange and red lamps which may have been lit.

For a further description of the circuit of a typical one of the amplifiers, peaks detectors, and power amplifiers forming the banks 80, 120, and 200, reference will now be made to FIGS. 2 through 4.

Figure 2:
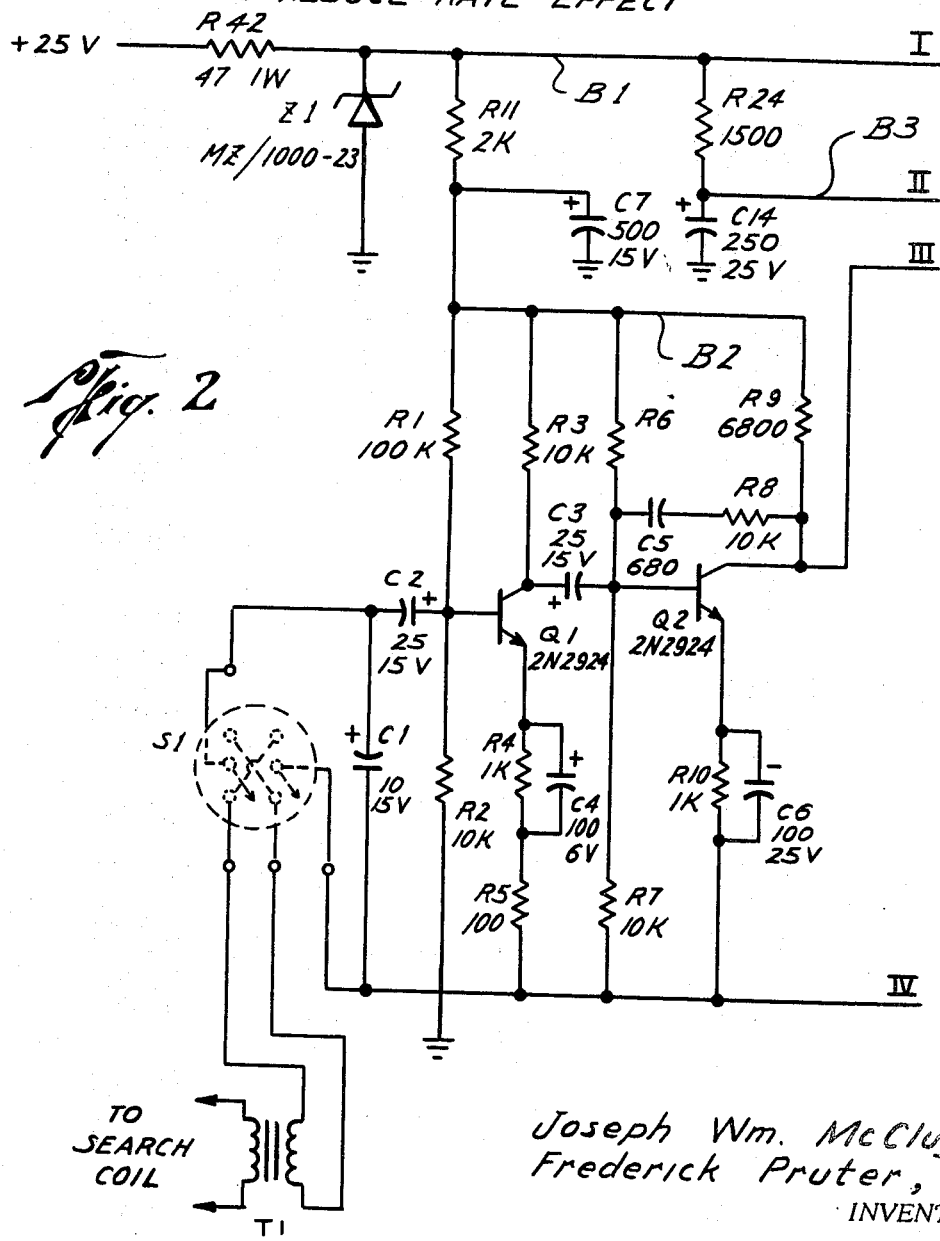
FIG. 2 is a circuit diagram of a typical amplifier component of the apparatus shown in FIG. 1.

Referring first to FIG. 2, the output of a search coil is fed to the primary of transformer T1. The secondary of the transformer is connected through reversing switch S1 and capacitor C2 to the base-emitter circuit of transistor Q1. A capacitor C1 shorts out high frequency components in any signal received from transformer T1, thereby eliminating as much as possible any response to 60 c.p.s. ripple in the direct current fed to magnetizing solenoids 52, 53.

An appropriate positive bias is applied to the base of transistor Q1 by voltage divider resistors R1, R2 between positive bus B2 and grounded conductor IV. Bus B2 is connected through isolation resistor R11 to positive bus B1. Capacitor C7 serves to stabilize the voltage on bus B2. Bus B1 is fed from a 25 volt positive power source through voltage dropping resistor R42; voltage in excess of the regulation voltage is hunted to ground through Zener diode Z1.

The collector of transistor Q1 is connected to positive bus B2 through load resistor R3 and is coupled to transistor Q2 by capacitor C3. Resistor R5, provides negative feedback to transistor Q1. Resistor R4 provides positive bias for transistor Q1, and capacitor C4 is used to by-pass resistor R4 to control negative feedback.

Resistors R6 and R7 provide a voltage divider to supply appropriate bias to the base of transistor Q2. The collector of transistor Q2 is connected to bus B2 through load resistor R9. Negative feedback is provided by resistor R8 and capacitor C5, and positive bias is provided by resistor R10 and capacitor C6 is to by-pass resistor R10 to control negative feedback.

The output signal of the amplifier shown in FIG. 2 appears between ground conductor IV and signal conductor III. Bus B1 is continued to the power amplifier by conductor I. An isolated positive bus B3 for the peak detector circuit is connected to bus B1 through isolation resistors R24 which is shunted to ground by capacitor C14, capacitor C14 being used for stabilizing the voltage. Bus B3 is continued to the peak detector circuit by conductor II.

Figure 3:
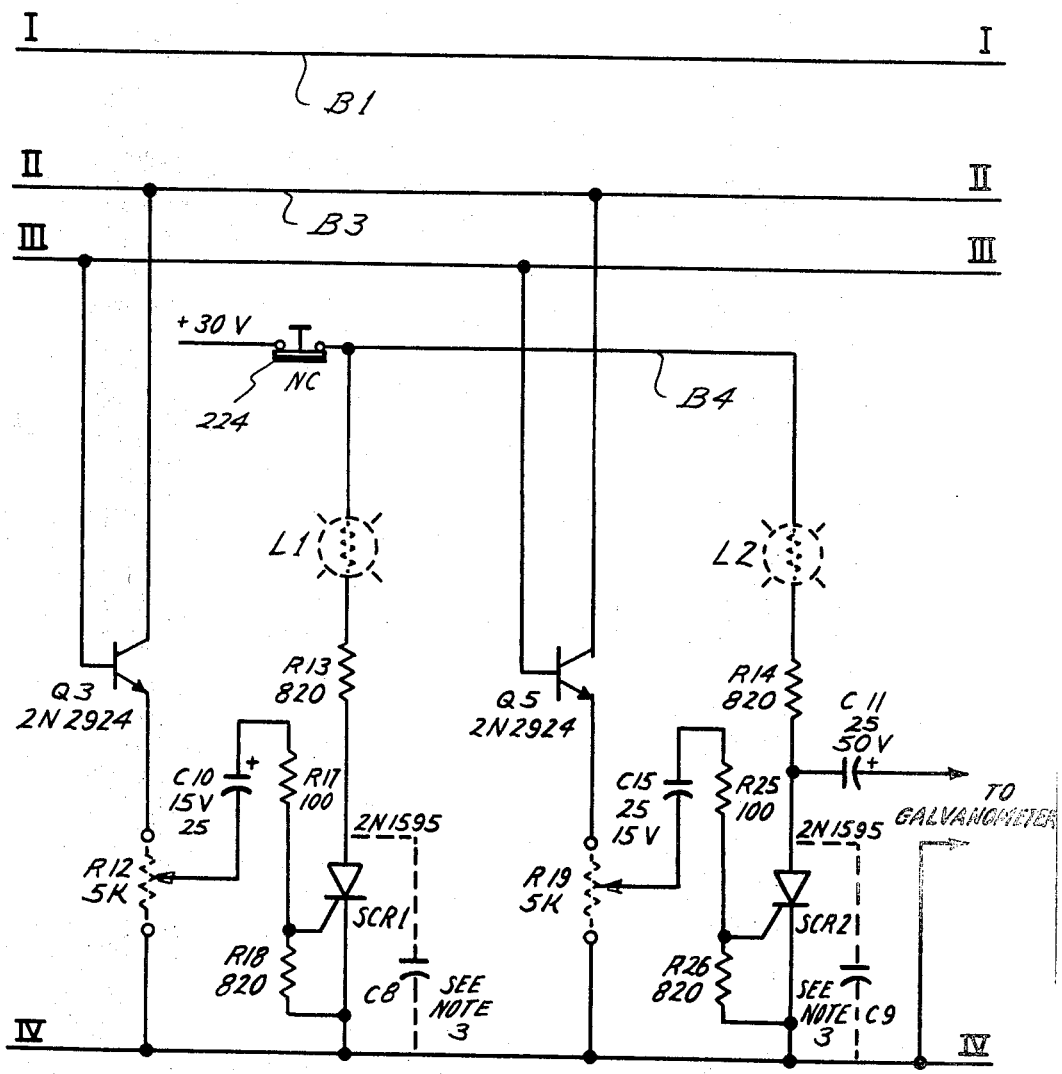
FIG. 3 is a circuit diagram of a typical peak detector component of the apparatus shown in FIG. 1.

Referring now to FIG. 3, the signal across conductors III and IV is fed to the paralleled base-emitter circuits of transistors Q3 and Q4. The collectors of the transistors Q3, Q4 are connected to positive bus B3 and their emitters are connected through load resistors R12, R19 to ground conductor IV. Adjustable taps on resistors R12, R19 are connected respectively through capacitors C10, C15 and through voltage dividers R17–R18 and R25–R26 to the gates of silicon controlled rectifiers SCR1 and SCR2. The controlled rectifiers are respectively in series with resistor R13 and incandescent lamp L1 on the one hand and resistor R13 and incandescent lamp L2 on the other. Both lamps are connected to bus B4 which is connected through normally closed switch 224 to a 30 volt positive power source (not shown). The cathodes of the controlled rectifiers are connected to ground conductor IV.

By adjusting the positions of the taps to resistors R12, R19, the magnitude of the signal required to cause conduction through the respective controlled rectifiers SCR1 and SCR2 can be selected as desired. For example the tap on R19 may be set to necessitate a larger signal to fire (render conductive) SCR2 than is required to fire SCR1. Lamp L2 would then be a red lamp under the previously described color scheme.

A capacitor C22 couples SCR2 to the event marking galvanometer.

Figure 4:
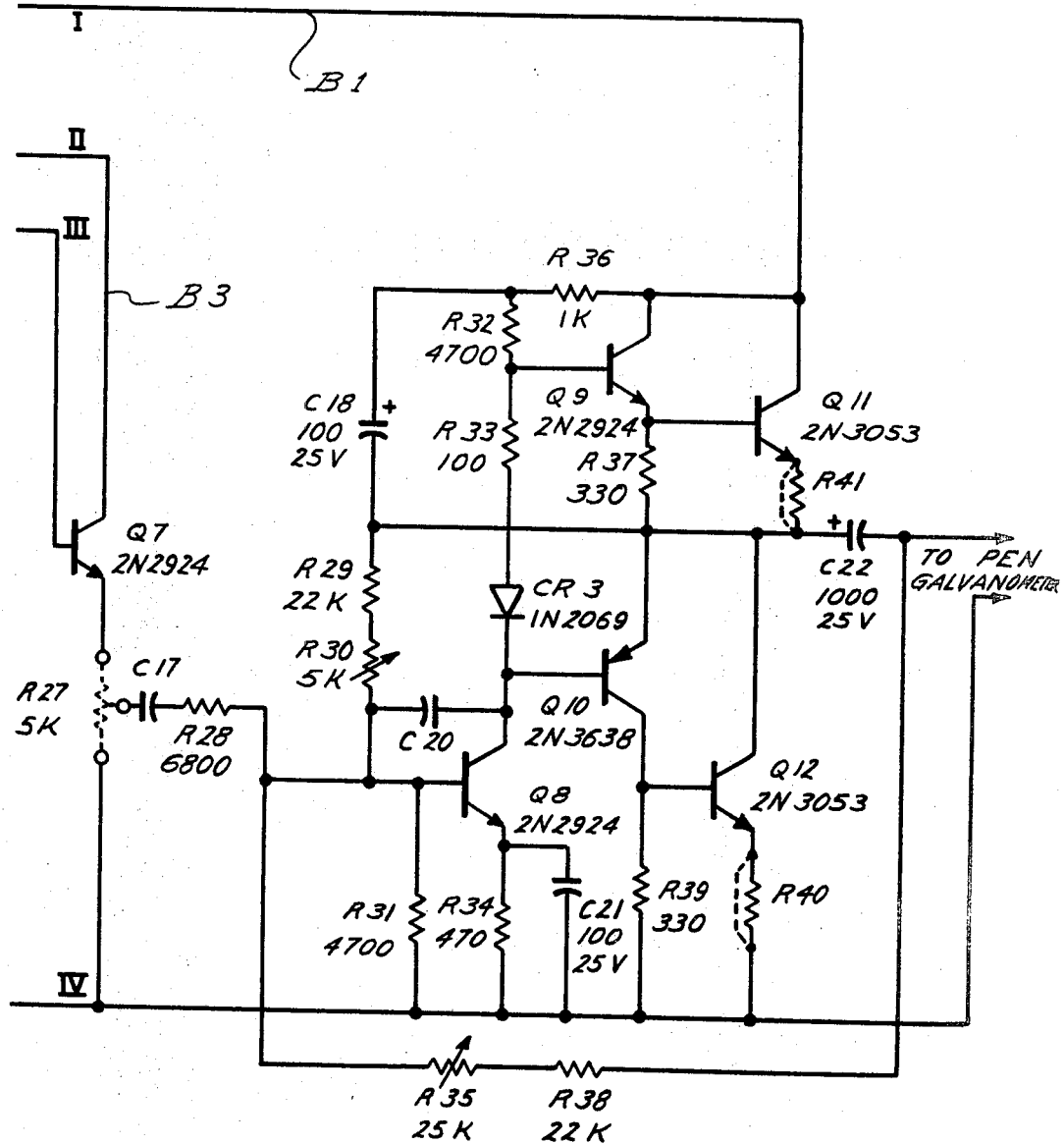
FIG. 4 is a circuit diagram of a typical power amplifier component of the apparatus shown in FIG. 1.

Referring now to FIG. 4, the signal across conductors III and IV is fed to the base-emitter circuit of transistor Q7. The collector of transistor Q7 is connected to positive bus B3 and its emitter is connected through load resistor R27 to ground conductor IV. An adjustable tap on resistor R27 is connected through capacitor C17 and voltage divider resistors R28, R31 to the base of transistor Q8. The collector of transistor Q8 is connected to bus B1 through voltage dividing load resistors R36, R32, and R33 and temperature compensating diode CR3 which functions as a temperature responsive resistor. The emitter of transistor Q8 is connected to ground conductor IV through negative feed back resistor R34 and capacitor C21. Two stages of push pull transistors Q9, Q10, Q11, Q12 are connected between bus B1 and ground conductor IV and receive signals from the load circuit of transistor Q8, load resistors R37, R39 and optional resistors R41 and R40 being in series with the respective transistors. Positive feedback is provided through capacitor C18, and resistors R29, R30. Variable resistor R30 is used to balance the output operating point of transistors Q9, Q10. Capacitor C20 is connected from base to collector of transistor Q8 so as to dampen any high frequency oscillations. Negative feedback is provided by resistors R35 and R38. In calibrating the apparatus, output can be varied by adjusting resistor R35. The amplified signal is fed through capacitor C22 to the pen galvanometer.

The apparatus described is subject to much variation dependent on the results desired. If pipe is to be graded into more than three grades (good, bad and fair), additional peak detector circuits and associated lamps may be provided. If desired, the event marker pen can be coupled to two or more sets of peak detectors, or a separate event marker pen can be provided for all or any desired number of sets of peak detectors. Conceivably, a separate event marker could be provided associated with each search coil. The search coils can be grouped to reduce the number of amplifier circuits and peak detector circuits. Automatic means may be provided to acutate reset switch 304, e.g. after a predetermined time or distance of travel or at the end of each inspection; this is especially helpful during calibration of the galvanometers and peak detectors when pipe with known flaws is run through the apparatus. Indicators other than simple lamps may be used, e.g. sonic indicators or mechanical registers. Any number of search coils may be used. The search coil carriage (and the solenoids) can be mounted on wheels and moved along the pipe instead of the pipe being moved through the search coils. The pipe can be magnetized by means other than solenoids, e.g. by passing current axially through the pipe. Signal generation can be created other than by relative axial movement of pipe and search coils, e.g. the relative motion of pipe and coils can be other than axial. Various non magnetic method of signal generation can be used. The feature of the invention is the use of peak detector circuits and indicator means to enable one operator to monitor a multitude of record traces and to give a response that is independent of the resonant characteristics and calibration and stability of recording galvanometers especially while at the same time allowing for a complete permanent record of signals generated to enable leisurely examination of areas of suspected defects.

What is claimed is:

1. Apparatus for inspection of material including
   a plurality of search coil means adapted to scan differing portions of the material to be inspected,
   means to generate signals in each of the search coil means in response to the presence of anomolies in the portion of the material scanned by the search coil means as function of a magnitude of the anomolies, and a plurality of electromechanical means to record separately a magnitude of the signals received from each search coil means as a function of position of the search coil means relative to the material being scanned thereby, said apparatus being distinguished by including:

a plurality of electronic switch means each connected to a different one of said search coil means and responsive to the signals in said search coil means exceeding a predetermined value for which that particular switch means is set to switch from a nonconducting to a conducting state, a plurality of indicator means each in circuit with a different one of said switch means responsive to the condition of the switch means to produce indication separate from the record of said electromechanical means to inform the operator whenever a signal exceeding the particular predetermined value for which that switch means is set appears in the search coil means connected to said switch means, a second plurality of electronic switch means each connected to a different one of said search coil means and responsive to the signals in said search coil means exceeding a predetermined value for which that particular switch means is set to switch from a nonconducting to a conducting state, each of the first said plurality of switch means being set to respond to signals of the same predetermined value as the other switch means in said first plurality of switch means, and each of the second said plurality of switch means being set to respond to signals of the same predetermined value as the other switch means in said second plurality of switch means, said predetermined value at which said second plurality of switch means is set to respond being lower than said predetermined value at which the first said plurality of switch means is set to respond, a second plurality of indicator means each in circuit with a different one of said second plurality of switch means responsive to the condition of the switch means with which it is in circuit to inform the operator whenever a signal exceeding said predetermined value for which the second plurality of switch means is set appears in the search coil means connected to the switch means with which the indicator is in circuit, and electromechanical means responsive to the condition of the first said plurality of switch means to record the receipt of a signal by any of said search coil means exceeding the predetermined value for which the first said plurality of switch means is set, the last said electromechanical means being unresponsive to the condition of the second said plurality of switch means.

2. Apparatus according to claim 1 further distinguished by each of said plurality of indicator means each comprising an incandescent lamp means which is lighted when the one said switch means in circuit therewith is conducting, and manual means to place all of said switch means in nonconducting state regardless of its pre-existing state.

3. Apparatus according to claim 1 further distinguished by each of the first said plurality of indicator means including a lamp means of one color which is lighted when the one of the first said plurality of switch means in circuit therewith is conducting, and each of the second said plurality of indicator means including a lamp means of another color which is lighted when the one of the first said plurality of switch means in circuit therewith is conducting.

References Cited

UNITED STATES PATENTS

| | | | |
|---|---|---|---|
| 2,889,513 | 6/1959 | Callan et al. | 324—37 |
| 3,343,079 | 9/1967 | Crouch | 324—37 |
| 3,444,459 | 5/1969 | Prindle et al. | 324—40 |
| 2,218,673 | 10/1940 | Drake | 324—37 |
| 3,219,908 | 11/1965 | Zarleng | 307—248 X |
| 3,247,453 | 4/1966 | Quittner | 324—37 |
| 3,394,303 | 7/1968 | Cressman et al. | 324—37 X |

ALFRED E. SMITH, Primary Examiner

U.S. Cl. X.R.

346—33